US009076194B2

(12) United States Patent
Gylling et al.

(10) Patent No.: US 9,076,194 B2
(45) Date of Patent: *Jul. 7, 2015

(54) SYSTEM AND METHOD FOR MONITORING QUILTING MACHINE (71) Applicant: A QUILTER'S EYE, INC., Fallbrook, CA (US)

(72) Inventors: Susan Gylling, Fallbrook, CA (US); Ren Livingston, Escondido, CA (US)

(73) Assignee: A QUILTER'S EYE, INC., Fallbrook, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/097,037

(22) Filed: Dec. 4, 2013

(65) Prior Publication Data
US 2014/0085456 A1   Mar. 27, 2014

Related U.S. Application Data (63) Continuation of application No. 12/344,386, filed on Dec. 26, 2008, now Pat. No. 8,633,982.

(60) Provisional application No. 61/016,915, filed on Dec. 27, 2007.

(51) Int. Cl.
*H04N 7/18* (2006.01)
*G06T 7/00* (2006.01)
*D05B 11/00* (2006.01)
*D05B 19/10* (2006.01)

(52) U.S. Cl.
CPC .............. *G06T 7/0004* (2013.01); *D05B 11/00* (2013.01); *D05B 19/10* (2013.01); *H04N 7/18* (2013.01)

(58) Field of Classification Search
CPC ........ D05B 19/12; D05B 19/08; D05B 11/00; D05B 19/14; D05B 45/00
USPC .......................................... 348/125; 382/111
See application file for complete search history.

(56) References Cited

U.S. PATENT DOCUMENTS

| | | | |
|---|---|---|---|
| 4,417,531 A | 11/1983 | Doyama | |
| 4,849,902 A * | 7/1989 | Yokoe et al. | 112/470.04 |
| 4,860,675 A | 8/1989 | Brower et al. | |
| 4,876,976 A | 10/1989 | Brower et al. | |
| 4,969,410 A | 11/1990 | Brower et al. | |
| 5,027,726 A | 7/1991 | Brower et al. | |
| 5,782,192 A * | 7/1998 | Kear et al. | 112/470.05 |
| 6,026,756 A * | 2/2000 | Frazer et al. | 112/118 |
| 6,202,001 B1 | 3/2001 | Muto | |
| 6,260,495 B1 * | 7/2001 | Stewart et al. | 112/470.05 |
| 6,263,815 B1 | 7/2001 | Furudate | |
| 6,321,671 B1 | 11/2001 | Tomita | |
| 6,959,657 B1 * | 11/2005 | Duval | 112/272 |
| 7,210,417 B2 * | 5/2007 | Koerner | 112/278 |
| 7,620,472 B2 | 11/2009 | Hamajima | |
| 8,633,982 B2 * | 1/2014 | Gylling et al. | 348/125 |

(Continued)

*Primary Examiner* — Duyen Doan
(74) *Attorney, Agent, or Firm* — Holland & Hart (57) ABSTRACT

A monitoring system for use with a sewing machine. The monitoring system includes a camera assembly mounted to a base of the sewing machine with a camera that collects images from a bottom side of the fabric. The camera assembly delivers images of the back side of the fabric to a monitor assembly that includes a display device. The display device displays the images collected by the camera. The monitor can be mounted to an upper or arm portion of the sewing machine for convenient viewing by the operator during use of the sewing machine.

20 Claims, 11 Drawing Sheets

(56) References Cited

U.S. PATENT DOCUMENTS

| | | | |
|---|---|---|---|
| 2005/0016428 A1* | 1/2005 | Koerner | 112/117 |
| 2006/0015209 A1* | 1/2006 | Schweizer | 700/136 |
| 2007/0032892 A1 | 2/2007 | Taguchi et al. | |
| 2007/0263919 A1* | 11/2007 | Wentkowski | 382/141 |
| 2007/0272136 A1* | 11/2007 | Shimizu | 112/2 |
| 2008/0006192 A1 | 1/2008 | Zeiger et al. | |
| 2010/0186646 A1 | 7/2010 | Stokes et al. | |

* cited by examiner

SYSTEM AND METHOD FOR MONITORING QUILTING MACHINE

CROSS-REFERENCE TO RELATED APPLICATION

This application is a continuation of application Ser. No. 12/344,386 filed Dec. 26, 2008, now U.S. Pat. No. 8,633,982, issued Jan. 21, 2014, which claims the benefit of the filing date of U.S. Provisional Application No. 61/016,915, filed Dec. 27, 2007, the disclosures of which are incorporated, in their entirety, by reference.

BACKGROUND

1. Technical Field

The present disclosure is directed to sewing devices, and more particularly to imaging systems for use with sewing devices and related imaging methods.

2. Related Art

Throughout American history, quilting has become a popular pastime. The craft today has experienced resurgence in popularity and enjoys significant participation by hobbyists in quilting shows, magazines, newsletters, clubs, societies, and the like. Although traditional quilt making may be at the root of this resurgence, the development of modern textiles, machinery, and labor saving sewing devices can be contributing to this resurgence, as many activities compete for the time of the average hobbyist or crafts person.

Quilting typically involves stitching together multiple layers of fabric to form a fabric assembly. A quilt typically includes at least an upper fabric layer, a lower fabric layer, and a layer of batting positioned between the upper and lower layers. Quilts can be created in various shapes, sizes, and can be used in many different ways such as to cover beds or mounting on walls.

Designs and patterns can be sewn or stitched into a quilt by hand or with a sewing machine, thereby adding an artistic element to the craft of quilt making. Some designs or patterns can be elaborate, thus requiring a high degree of skill and dexterity at the part of the crafts person. In some cases, sewing machines can be equipped with pre-programmed stitching patterns to assist in performing these tasks more accurately and with a greater degree of intricacy than when quilting by hand. More importantly, quilting can require hours of time if performed manually even by the most skilled crafts person.

Due to the significant time requirements to manually create a quilt, industrial quilting machines or quilting assemblies have been developed for use in producing quilts in high quantities. These types of industrial quilting assemblies typically include heavy-duty, bulky sewing machines disposed in a stationary position wherein the quilt, mounted on a quilting frame, is moved relative to the sewing machine. One disadvantage with these types of industrial quilting assemblies is the significant work area required to move and position the quilting frame relative to the sewing machine.

Household sewing machines have resulted in both significant time savings and quality improvements over traditional hand sewing methods and industrial style sewing machines. Nevertheless, manipulating large pieces of cloth, such as a quilt, with respect to stationary sewing machines is typically cumbersome and a laborious process. Long arm quilting machines have been developed in part to address the problems associated with manipulating large quilts while stitching together multiple layers of cloth. Long arm quilting machines make it possible to move the sewing machine relative to the quilting frame typically in two degrees of motion: along a longitudinal axis across a width dimension of the quilt, and a lateral axis along the length dimension of the quilt.

When using a long arm quilting machine, the long arm quilting machine is typically mounted to a quilting table. The quilting table typically has a width dimension of about 8-14 feet and includes multiple rollers upon which the quilt is mounted. Some of the rollers usually hold that portion of the quilt that is unstitched (e.g., different layers of cloth and batting) and the other roller holds the stitched portion of the quilt. When the quilt is mounted to the rollers, the rollers are spaced apart a distance typically about 18 to 24 inches. That portion of the quilt extending between the rollers is available for stitching by the long arm quilting machine. One of the rollers is positioned within a neck cutout portion of the quilting machine and the other rollers are positioned outside of the quilting machine. The operator can create stitches on the exposed part of the quilt by moving the quilting machine in the longitudinal and traverse directions relative to the rollers and fabric mounted to the rollers.

When creating stitches on the quilt with the quilting machine, the operator typically can see only the top surface of the quilt where the stitches are being formed. Only after later rolling up a stitched portion of the quilt onto one of the rollers is the bottom side of the quilt positioned such that the operator can see the stitched pattern on the bottom side of the quilt.

Any defects in the stitching on the quilt typically have to be removed by hand. The unstitching process can be extremely time-consuming. Some common stitching defects when quilting include poor thread tension, loops in the thread, tucks in the fabric, and incorrect pattern of the stitches.

SUMMARY

The present disclosure is directed to imaging and other monitoring systems for use with sewing machines. In one example, a monitoring system is mounted to a long arm quilting machine. The monitoring system includes a camera assembly mounted to a base of the quilting machine with a camera that collects images from a back or bottom side of the layers of fabric being stitched by the quilting machine to form a quilt. The camera assembly delivers images of the back side of the quilt to a monitor. The monitor displays the images collected by the camera assembly. The monitor can be mounted to an upper or arm portion of the quilting machine for convenient viewing by the operator during use of the quilting machine. In other arrangements, the monitor can be positioned and/or mounted at various locations on the quilting machine, the quilting frame that supports the quilting machine, the operator, or the building structure in which the quilting machine is stored and operates. In still other arrangements, the monitor can be integrated into the quilting machine. For example, the monitor can be integrated into a control panel or a display screen of the quilting machine. In one example, the monitor is part of a touch screen panel that functions at least in part as a user interface for control of the quilting machine.

In other arrangements, the monitor assembly can collect additional information beside an image of the back or under side of the layers of fabric being stitched by the quilting machine. For example, the monitor assembly can include at least one camera assembly that collects images of other portions of the layers of fabric such as the rolled up portions of the layers of fabric, a top or upper side of one or more layers of fabric, or various portions of the quilting machine (e.g., the needle or spools of thread).

The above summary is not intended to describe each disclosed embodiment or every implementation of the inventive aspects disclosed herein. Figures of the detailed description that follow more particularly describe features that are examples of how certain inventive aspects may be practiced. While certain embodiments are illustrated and described, it will be appreciated that the disclosure is not limited to such embodiments or arrangements.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, one of skill in the art will understand that the exemplary embodiments described herein are not intended to be limited to the particular forms disclosed. Rather, the instant disclosure covers all modifications, equivalents, and alternatives falling within the scope defined by the appended claims.

DETAILED DESCRIPTION OF THE PREFERRED EMBODIMENT

Various embodiments will be described in detail with reference to the drawings, wherein like reference numbers represent like parts in assemblies throughout the several views. Reference to various embodiments does not limit the scope of the claims attached hereto. Additionally, any examples set forth in the specification are not intended to be limited and merely set forth some of the many possible embodiments for the appended claims.

The following discussion is intended to provide a brief, general description of a suitable environment in which inventive aspects can be implemented. Although not required, the vision system will be described in the general context of a long arm quilting machine. The structure, creation, and use of some example monitoring systems and methods are described hereinafter.

The example embodiments disclosed herein have a wide application to a number of sewing machine applications beyond the long arm quilting machine applications emphasized herein. While such alternative applications and environments are possible, emphasis is placed on the application of monitoring systems for a long arm quilting machine, as that particular application is particularly benefited from the embodiments described herein with reference to the attached figures.

The examples disclosed herein are directed to monitoring systems for use with a sewing machine such as a long arm quilting machine. The monitoring system can include an imaging device such as a camera. The imaging device can produce real-time video images or a series of still images of a portion of the fabric being sewn that is otherwise not exposed for viewing by the operator of the sewing machine. The imaging device can be a digital or an analog device.

A monitor can be used in conjunction with the monitoring device to display the image created by the imaging device. The monitor can be mounted at a location that is convenient for viewing by the operator, for example, viewing by the operator from a position operating the sewing machine. In one example, the imaging member is mounted to a base of the sewing machine at a location vertically below the layers of fabric being sewn when the layers of fabric are oriented in a generally horizontal plane. The monitor can be mounted to, for example, a portion of the sewing machine such as an arm portion of the sewing machine and is configured to display an image from the camera assembly for viewing while the operator is operating the sewing machine.

The use of a monitoring system with a long arm quilting machine can provide a number of benefits. For example, in the event defects are created in the stitching along the under or bottom side of the fabric being stitched, the operator can visually observe these defects on the monitor and make immediate corrections (e.g., stop the sewing machine and remove the defects). Typically, if the stitching defect is not observed until after the pass by the sewing machine across the quilt is complete and the stitched portion of the quilt is rolled up into a position where the operator can observe the defect, significant amounts of unstitching are required to remove the stitching defect. The ability to observe such defects (i.e., stitching loops, folds in the fabric, poor tension in the thread of the stitches) before creating a pattern of stitches across a substantial portion of the quilt width can save the operator from having to unstitch or re-do significant amounts of stitching.

The Example Sewing Assembly Shown in FIGS. 1-13

A schematic version of a sewing assembly 10 is now described with reference to FIGS. 1-13. The sewing assembly 10 includes a quilting machine 12, a quilting table assembly 14, and a monitoring system 16. A quilt 18 (see FIGS. 1 and 2) can be mounted to the quilting table assembly 14 to receive stitching from the quilting machine 12. A top surface of the quilt is exposed to view by the operator, who usually stands adjacent the quilting machine 12 with the quilting machine at/or below the head and shoulders of the operator. A bottom or underside of the quilt (not shown) is positioned out of view of the operator until the portion of the quilt being stitched is later rolled up upon the rollers of the table assembly 14. Sometimes, depending on the direction of rolling the quilt onto rollers of the quilting table assembly, the bottom side of the quilt is not viewable at all until the quilt is removed from the table assembly.

Figure 1:
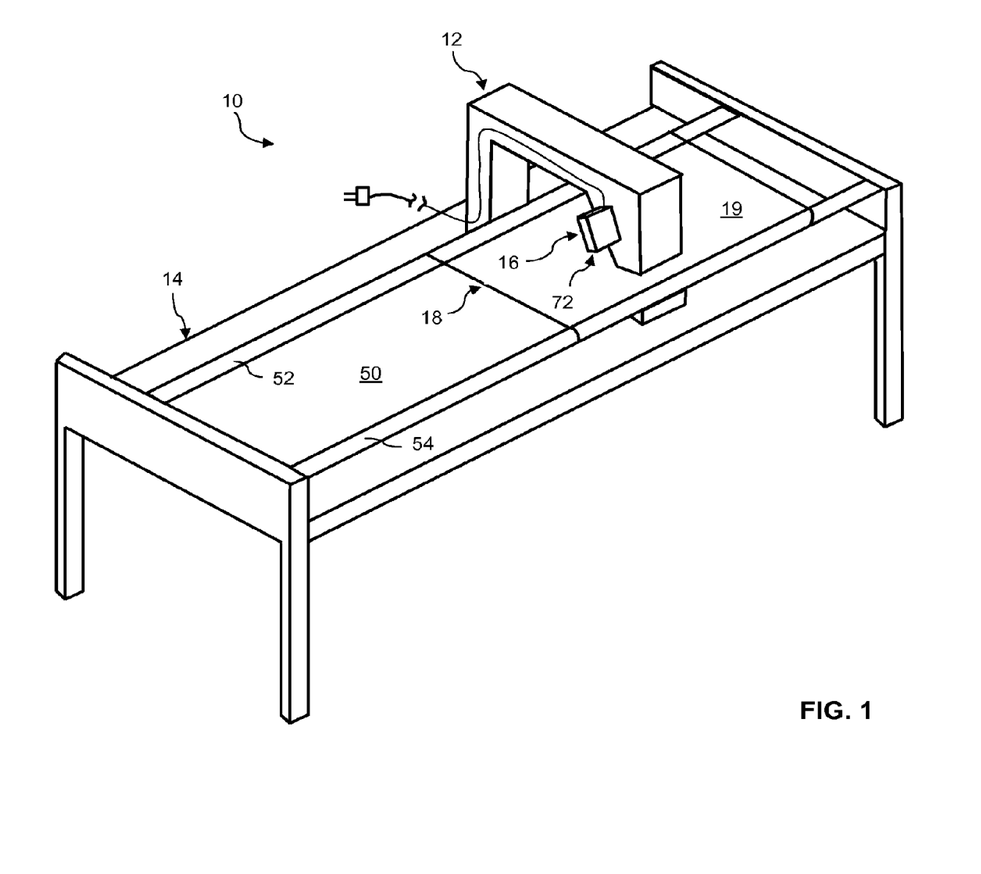
FIG. 1 is a schematic perspective view of an example sewing assembly in accordance with principles of the present disclosure.
Figures 2, 3:
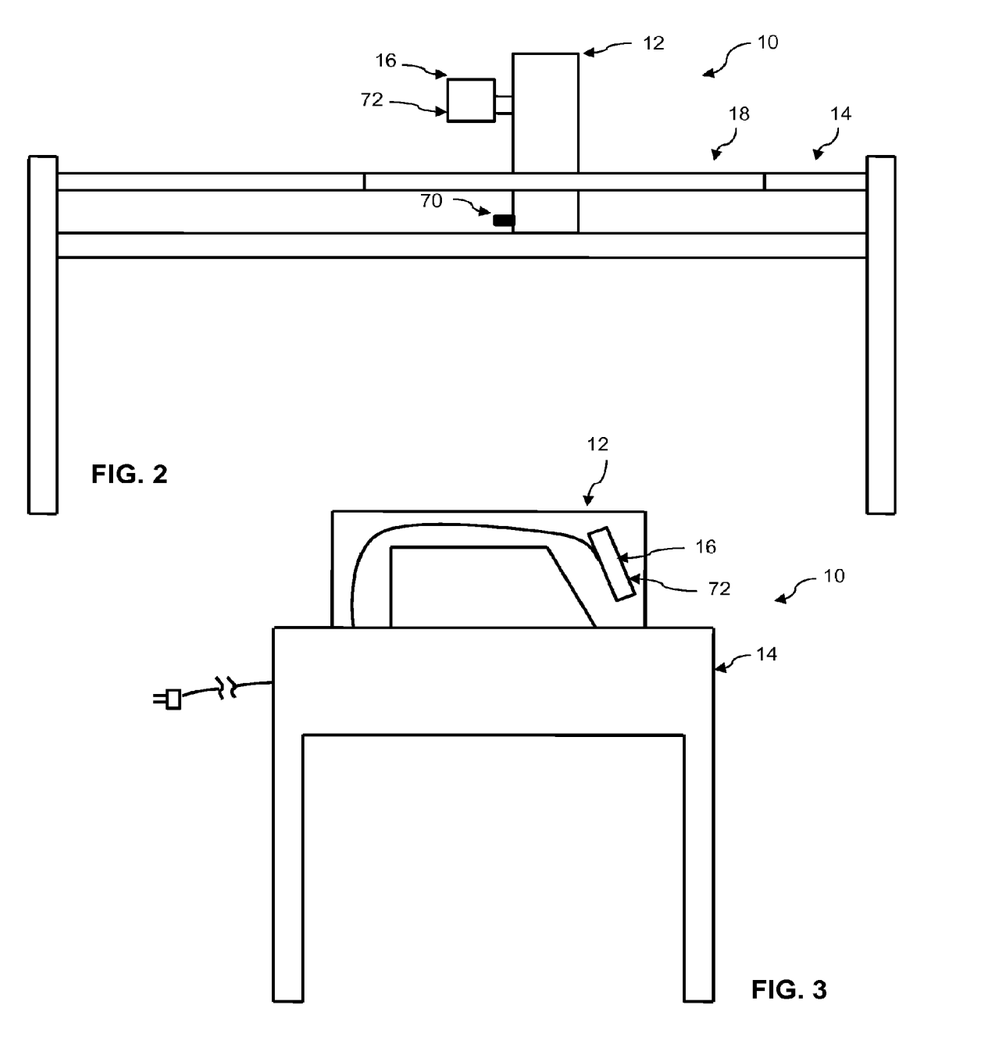
FIG. 2 is a schematic front view of the example sewing assembly shown in FIG. 1.
FIG. 3 is a schematic side view of the example sewing assembly shown in FIG. 1.
Figure 4:
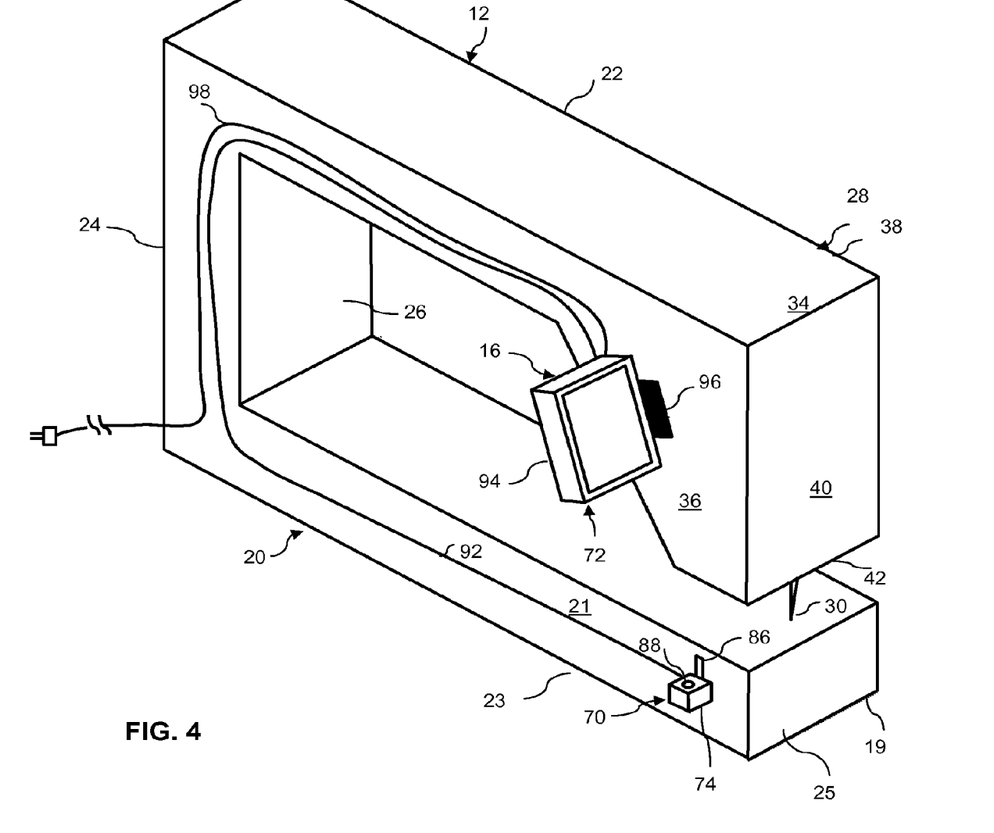
FIG. 4 is a schematic perspective view of a quilting machine of the sewing assembly shown in FIG. 1.
Figure 5:
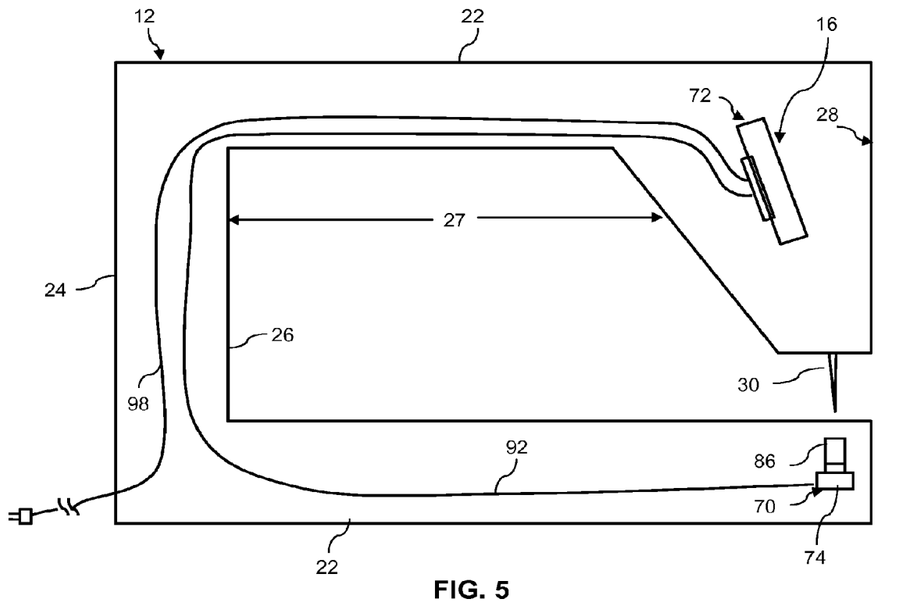
FIG. 5 is a schematic side view of the quilting machine shown in FIG. 1.
Figure 6:
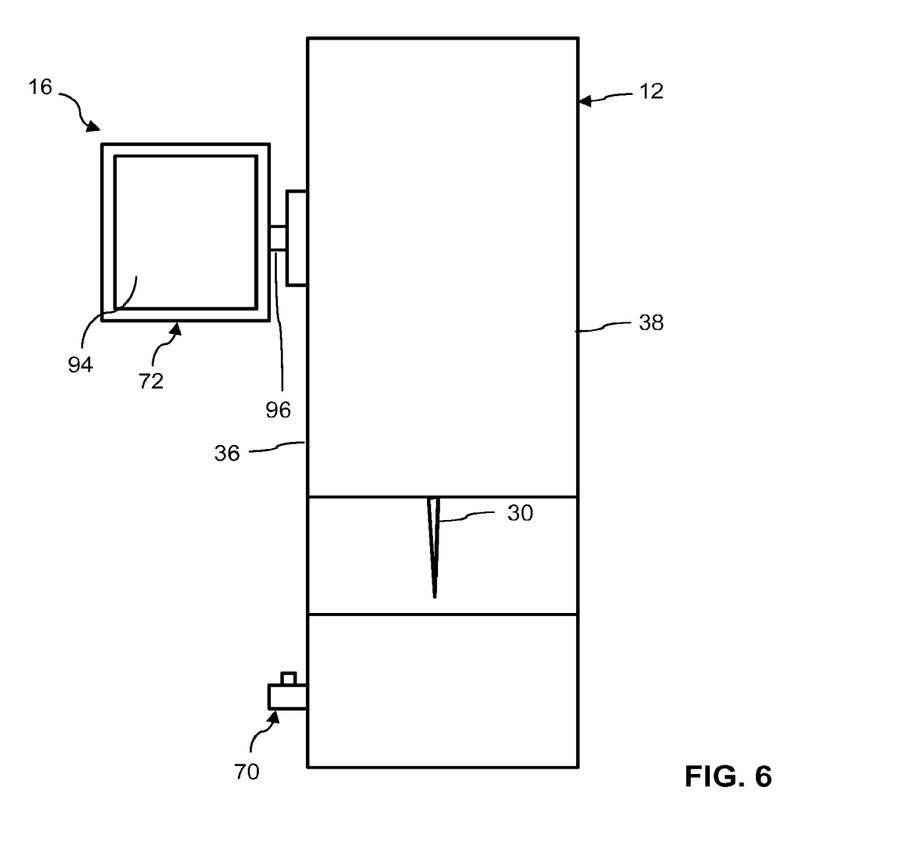
FIG. 6 is a schematic front view of the quilting machine shown in FIG. 1.
Figure 7:
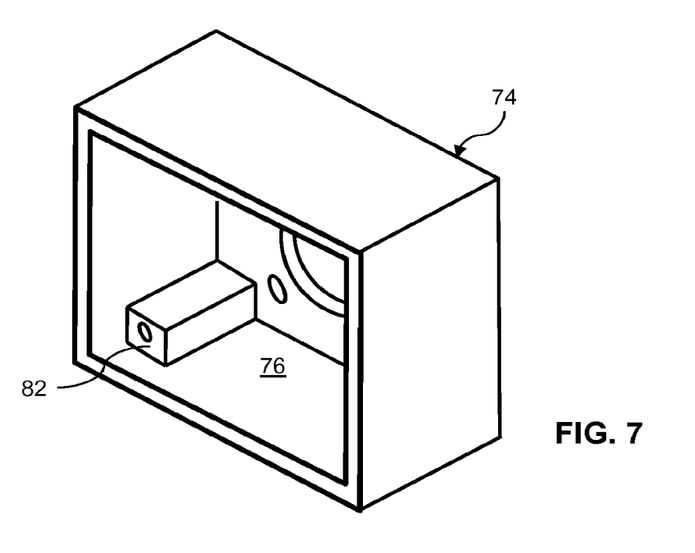
FIG. 7 is a schematic perspective view of a camera housing of the sewing assembly shown in FIG. 1.
Figure 8:
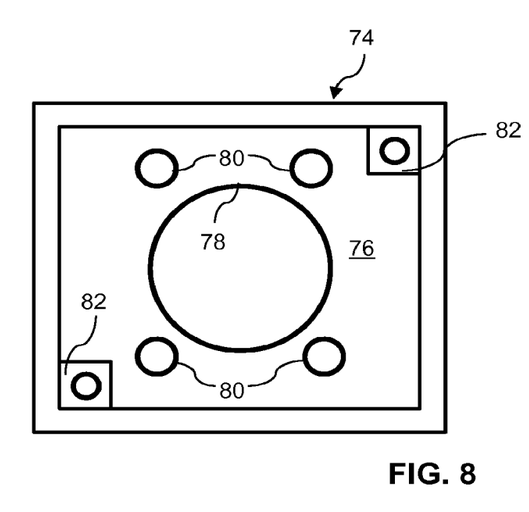
FIG. 8 is a schematic front view of the camera housing shown in FIG. 7.
Figure 9:
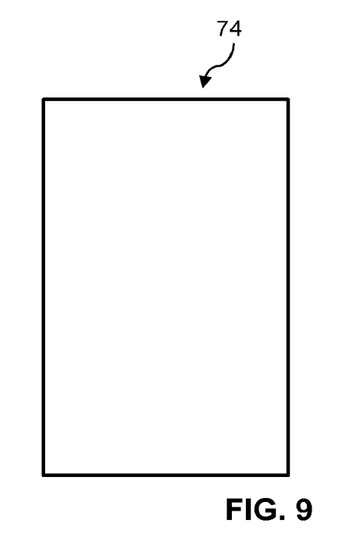
FIG. 9 is a schematic side view of the camera housing shown in FIG. 7.
Figure 10:
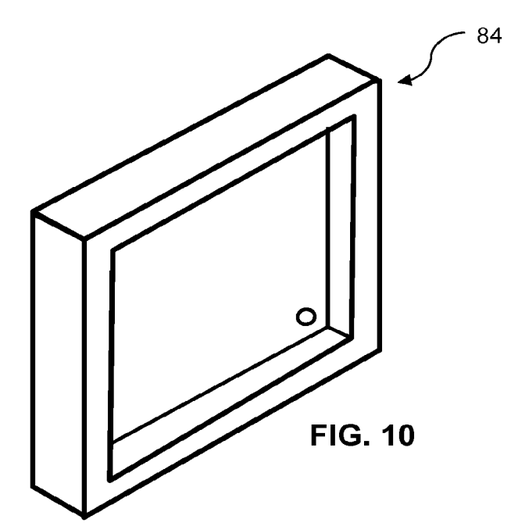
FIG. 10 is a schematic perspective view of an example rear cover plate used in conjunction with the camera housing shown in FIGS. 7-9.
Figure 11:
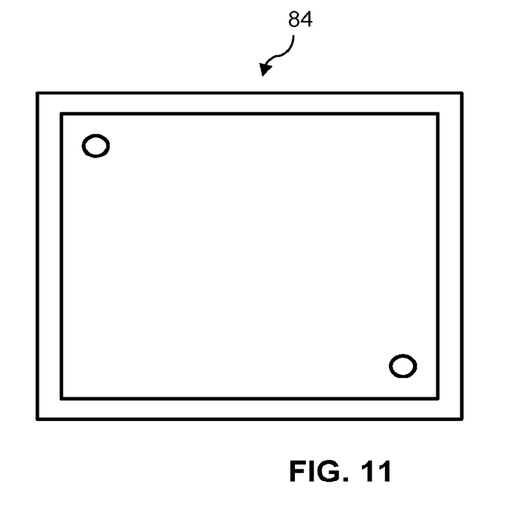
FIG. 11 is a schematic front view of the cover plate shown in FIG. 10.
Figure 12:
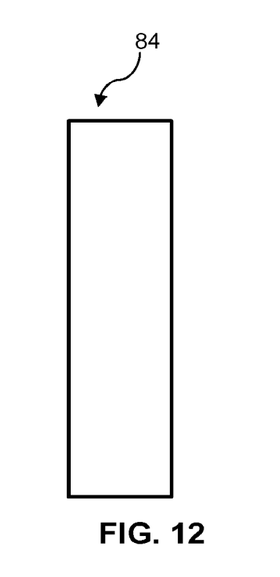
FIG. 12 is a schematic side view of the cover plate shown in FIG. 10.
Figure 13:
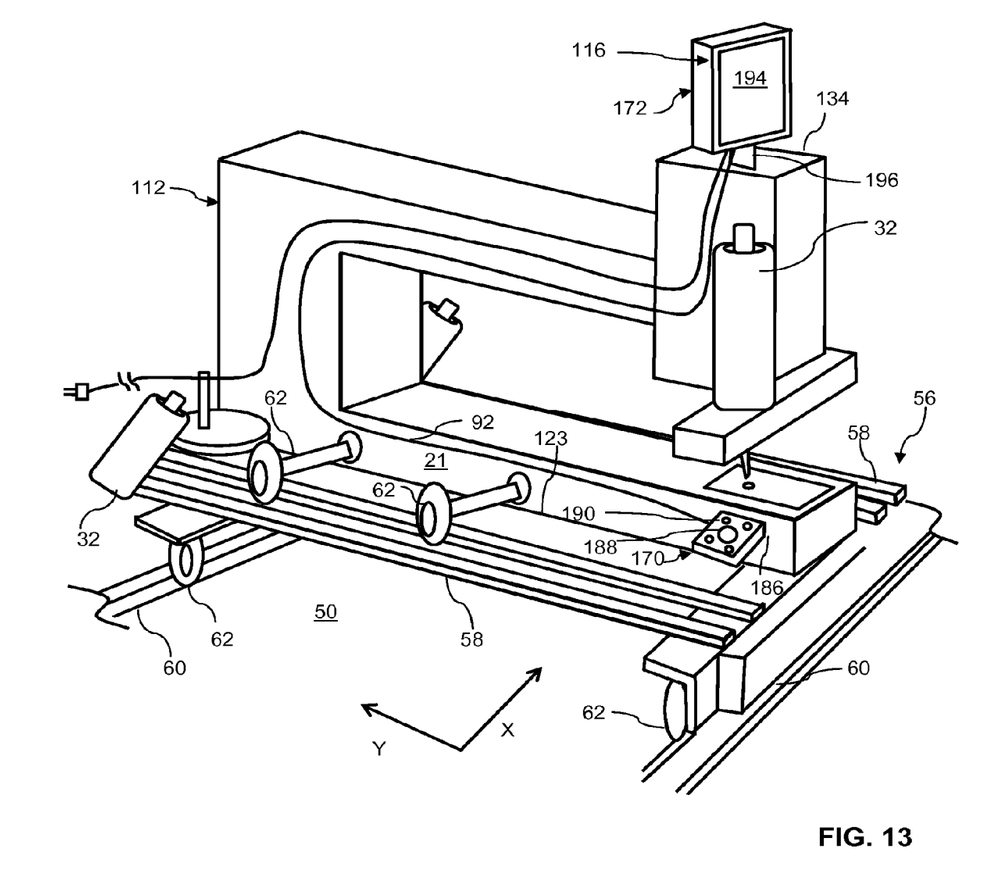
FIG. 13 is a schematic perspective view of another example quilting machine in accordance with principles of the present disclosure illustrating the carriage assembly that provides lateral and longitudinal movement of the quilting machine relative to a quilting table assembly.

The quilting machine 12 includes a base 20 (see FIGS. 4-6), an arm 22, a rear support member 24, a throat 26 having a throat depth 27, a needle support member 28, a needle 32, and one or more guiding members 32 (see, for example, FIG. 13). The base 20 includes first and second side surfaces 19, 21, a bottom surface 23, and a front surface 25. Each of the surfaces 19, 21, 23, 25 can be used for mounting portions of the camera assembly 70 at a desired location relative to the quilt 18.

The needle support member 28 includes a top surface 34, first and second side surfaces 36, 38, a front surface 40, and a bottom surface 42. The surfaces 34, 36, 38, 40, 42 can also be used to mount portions of the monitoring system 16 relative to the quilt 18 and the operator of the sewing assembly 10.

The throat 26 is sized to permit a quilt support (i.e., a roller) of the quilting table assembly 14 upon which a portion of the quilt 18 is wound. That portion of the quilt 18 positioned within the throat 26 can be a portion of the quilt that is unstitched or a portion of the quilt that has already been stitched depending on the configuration and use of the quilting machine 12.

The quilting table assembly 14 includes a mounting surface 50 that supports the quilting machine 12, first and second quilt supports 52, 54 (also referred to as rollers), and a carriage assembly 56. An example carriage assembly 56 is shown in further detail with reference to FIG. 13. The carriage assembly 56 can include a set of lateral rails 58 that permit movement of the quilting machine 12 in a lateral direction X, a set of longitudinal rails 60 that permit movement of the quilting machine 12 in a longitudinal direction Y, and a plurality of quilting machine supports 62 that permit movement of the quilting machine 12 relative to the carriage assembly 56.

The monitoring system 16 includes a camera assembly 70 and a monitor assembly 72. The camera assembly 70 includes a camera housing 74 that defines a cavity 76, a camera aperture 78, a plurality of LED apertures 80, and a plurality of fastener mounts 82 (see FIGS. 7-9). A rear cover plate 84 (see FIGS. 10-12) can be mounted to the camera housing 74 to enclose the cavity 76. A mounting bracket 86 is used to mount the camera housing 74 to a mounting surface such as a side surface 21 of the base 20 of the quilting machine 12. A camera 88 (see FIG. 4) and a plurality of LEDs 90 (e.g., see FIG. 15) can be mounted in the camera housing 74 and oriented in a direction facing the bottom side of the quilt 18 when the quilt 18 is mounted to quilt supports 52, 54 of the quilting table assembly 14. An electronics cable electrically couples the camera 88 and LEDs 90 to the monitor assembly 72 with an electronics cable 92. The cable 92 can include two or more cables that provide electrical connection between the camera assembly 70 and monitor assembly 72 as well as provide a connection to a power source such as a power adapter 98 (see FIG. 5).

In one example, the housing 74 and rear cover plate 84 are machined from a block of 6061 aluminum that is hollowed out to make the cavity 76 that holds electronics, wiring, and other components such as portions of the camera 88 and LEDs 90.

The camera 88, in one example, is a COP-USA BC-91P color ¼ DSP made by Sony Corp. that provides about 420 lines of resolution using a 5.5 mm pinhole lens. Many other types of imaging equipment can be used as the camera 88, such as any common charge coupled device (CCD) camera. For example, an imaging device that takes a plurality of still shots at predetermined time intervals can be used in place of a real time video type camera such as the Sony camera described above. The camera 88 can have capabilities for collecting images in dark conditions without the use of additional lighting at the bottom side of the quilt (i.e., without the need for LEDs 90).

The LEDs 90 are used to produce light that illuminates the bottom side of the quilt 18 in the area in which the camera 88 is collecting an image. In one example, the LEDs are 3 mm white LEDs that are wired in series with each other and in parallel with the camera 88. Preferably, at least one LED or other type of light source is used to help illuminate the bottom side of the quilt 18.

One or more fasteners can be used to secure the rear cover plate 84 to the camera housing 74. In one example, a pair of #1-64 screws extend through the rear cover plate 84 and into engagement with the fastener mounts 82.

The mounting bracket 86 is secured to the camera housing 74 and provides a mounting surface for securing the mounting bracket 86 to the quilting machine 12. In one example, the mounting bracket 86 is made from a 1 in.×½ in.×¹⁄₁₆ in. piece of sheet metal that is formed into a desired shape and then mounted to the camera housing 74 and the quilting machine 12 with #1-64 screws. The mounting bracket 84 can be configured to mount to an existing fastener of the quilting machine 12 while still positioning the camera 88 and LEDs 90 at a location adjacent to the quilt 18 for proper imaging of the quilt 18. In one arrangement, the lens of the camera 88 is positioned within about 4 in. of the quilt 18, and more preferably in the range of about 1 to about 2 in. from the quilt 18.

In some arrangements, the camera 88 is integrated into features of the quilting machine 12. In one example, the camera 88 is at least partially embedded in a surface of the quilting machine 12, such as in one of the surfaces 19, 21, 23, 25 of the base 20. Alternatively, the camera 88 can be mounted to other structure or devices in the vicinity of the quilting machine 12, such as the quilting table assembly 14 or the floor structure upon which the quilting machine 12 is supported. Typically, the camera 88 is configured to move with the quilting machine 12 relative to the quilt 18 to provide images of stitches formed in the quilt 18 within a space of about 1 to about 36 inches from the needle 30, and more preferably in the range of about 3 to about 12 inches from the needle. Positioning the camera 88 relatively close to the needle 30 provides the operator with information about the stitching most recently completed so that the operator can cease further operation of the quilting machine 12 if needed to correct a defect in the stitching without significant defective stitching being created.

The monitor assembly includes a monitor or screen 94 and a mounting bracket 96. The monitor 94 is mounted to a side surface 36 of the needle support member 28 of the quilting machine 12 (see FIG. 4). In other arrangements, the monitor 94 is mounted to other surfaces of the quilting machine 12 such as, for example, the top, second side, front or bottom surfaces 34, 38, 40, 42, respectively. Still in other examples, the monitor 94 can be mounted to other structures such as, for example, hanging from a ceiling structure in which the sewing assembly 10 is housed, a separately oriented stand member that extends from the floor structure upon which the sewing assembly 10 is supported, a portion of the quilting table assembly 14 such as the mounting surface 50, or any other structure that supports the monitor 94 at a location where the operator of the sewing assembly 10 can readily view the monitor to observe an image of the bottom side of the quilt 18 being collected by the camera 88.

The camera assembly 70 and monitor assembly 72 can be powered by an external power source such as, for example, a 12V regulated power supply at 1.25 amps that is wired in parallel to the camera assembly 70 and monitor assembly 72.

An example device used for the monitor 94 is an LCD display, Part No. PLHR-56R, manufactured by Pyle Audio. The monitor 94 can be, for example, a color LCD screen or a black and white screen. In some arrangements, the monitor 94 is integrated into the quilting machine 12 as, for example, part of a control panel, touch screen, or display associated with other functionality of the quilting machine 12. The mounting bracket 96 can provide a rotating or swiveling mount of the monitor 94, or can be a fixed orientation type mounting bracket. Other types of monitor products and mounting brackets could be used to meet the needs of the operator.

Referring now to FIG. 13, some alternative features for a monitoring system 116 are shown and described. The camera assembly 170 includes a mounting bracket 186 that mounts a camera 188 and LEDs 190 to a surface 123 of a quilting machine 112. A monitor assembly 172 includes a mounting bracket 196 that mounts a monitor 194 to a top surface 134 of the quilting machine 112.

Figure 14:
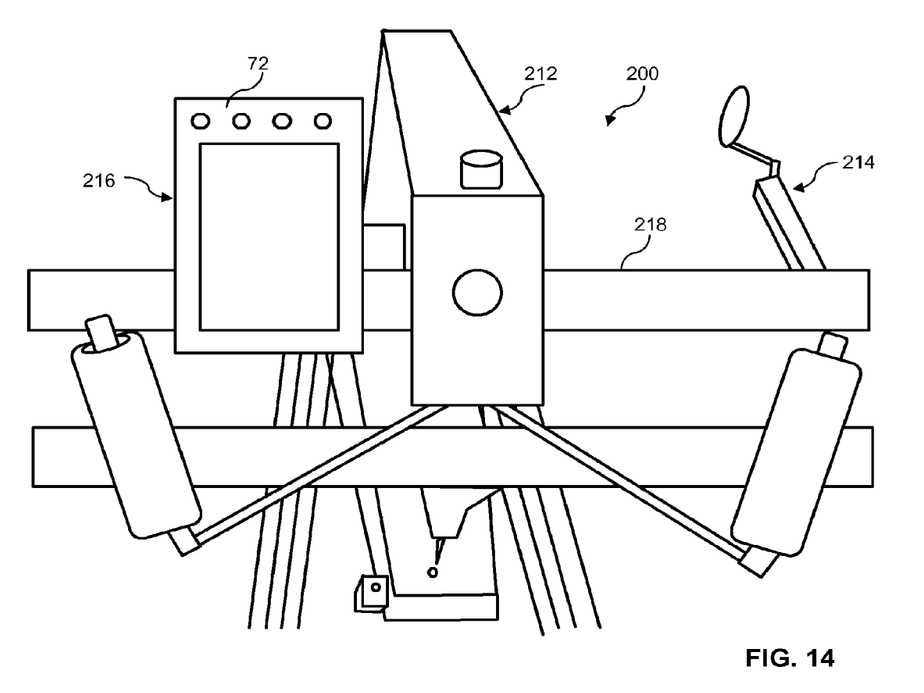
FIG. 14 is a schematic front view of another example sewing assembly in accordance with principles of the present disclosure providing a close-up view of a monitor assembly.
Figure 15:
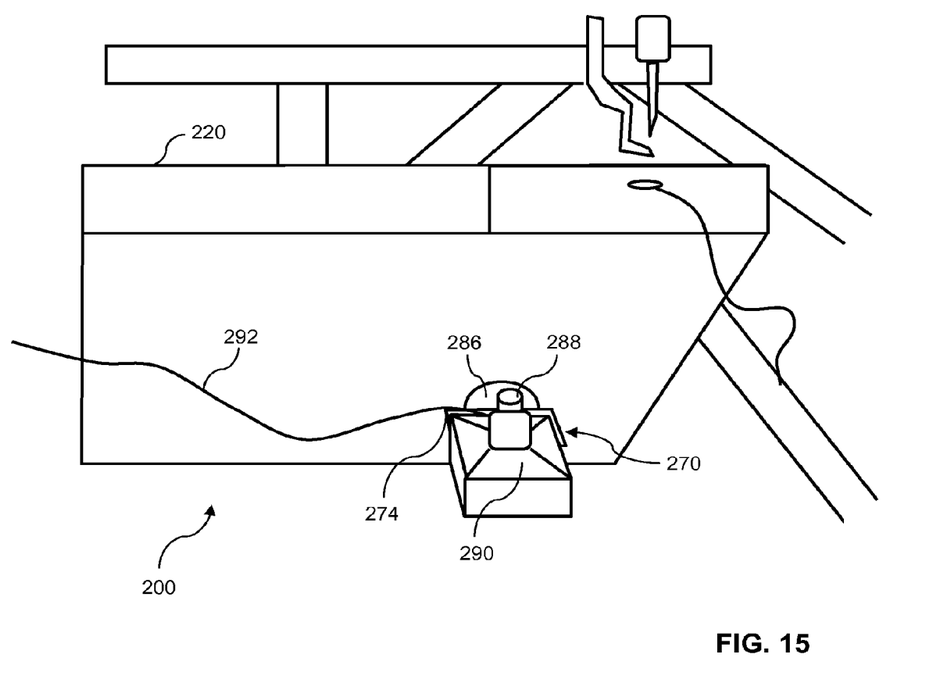
FIG. 15 is a close-up side view of a camera assembly of a sewing assembly shown in FIG. 16.
Figure 16:
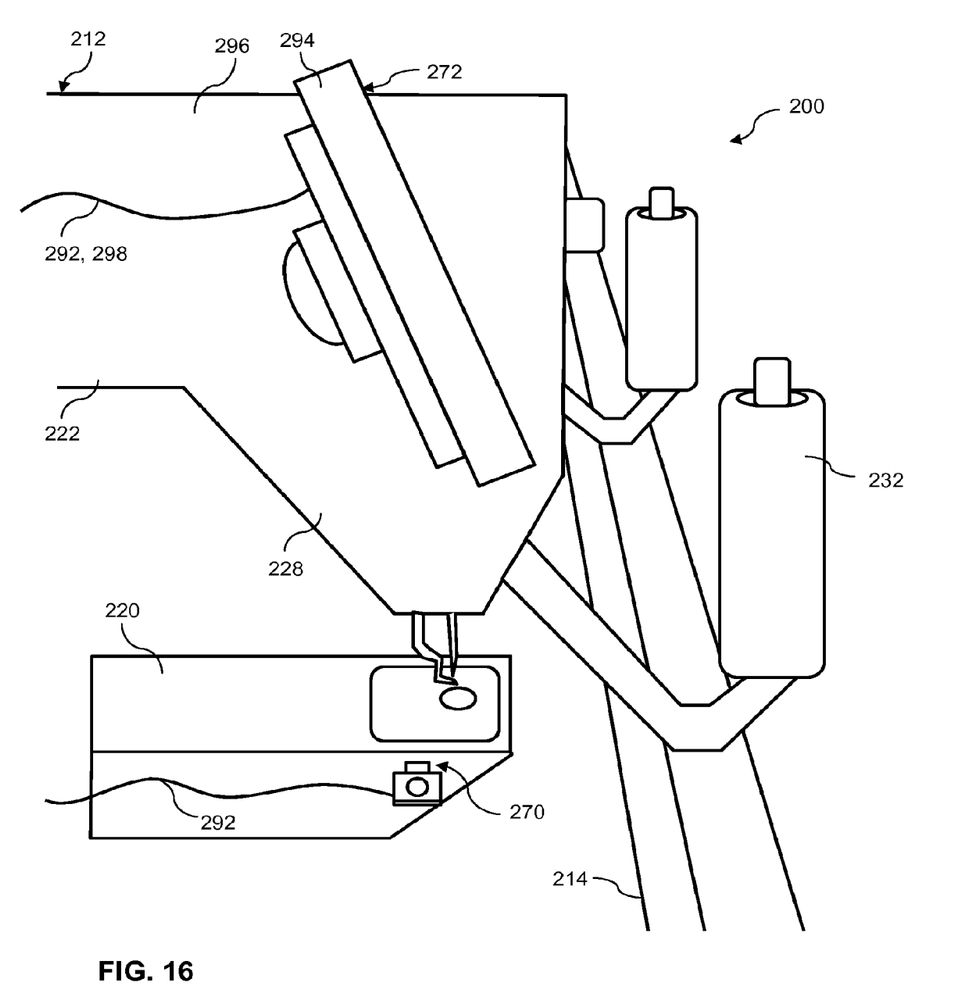
FIG. 16 is another side assembly of the sewing assembly shown in FIG. 14 illustrating portions of the camera assembly and monitor assembly.

The Example Sewing Assembly of FIGS. 14-16

Another example sewing assembly 200 is now described with reference to FIGS. 14-16. The sewing assembly 200 includes a quilting machine 212, a quilting table assembly 214, a monitor assembly 216 and a quilt 218.

FIG. 15 illustrates a close-up view of a camera assembly 270 that includes a camera housing 274 mounted to a frame 220 of the quilting machine 212 with a mounting bracket 286. The camera 288 and a plurality of LEDs 290 are mounted to the housing 274. The camera assembly 270 is coupled in electrical communication with a monitor assembly 272 (see FIG. 16) with a set of electronic cables 292 and power adapter 298.

FIG. 16 illustrates the monitor assembly 272 including a monitor 294 mounted to an arm 222 or a portion of a needle support member 228 of the quilting machine 212. The sewing assembly 200 further includes at least one guiding member 232 to move the quilting machine 212 relative to a quilt 218 supported on the quilting table assembly 214.

Alternative Features and Considerations

The monitoring systems disclosed herein can be used with automated quilting machines and other sewing machines besides the long arm quilting machines disclosed herein. In some examples, the monitoring system can include wireless capabilities to eliminate some if not all of the hard wiring used to communicate between the camera assembly and monitor assembly. Further, alternative power sources may be used to eliminate or shorten the power cord that provides power to the monitoring system. For example, at least some features of the monitoring system can operate using battery power or power supplied through the sewing machine to which the monitoring system is mounted.

In some arrangements, the monitoring system can include digital visual recognition capabilities. Such digital recognition capabilities could be useful in automatically identifying defects in stitching on the bottom side of the quilt and providing, for example, emergency stop, alarms and other notification to the operator when such defects are detected. Such defects may include imperfections in a stitched pattern, improper thread tension, undesired loops in the thread of the stitch, folds in the material captured in a stitch of thread, and other defects.

The mounting bracket used to mount the camera to the quilting machine can have different configurations to provide additional functions. For example, the mounting bracket can be configured to provide adjustability of the camera position and orientation relative to the quilting machine and the quilt supported on the quilting table assembly. In one example, the mounting bracket provides adjustability of the camera into a position wherein the camera can collect an image of the needle of the quilting machine. The image of the needle can be viewed on the monitor assembly of the monitoring system, preferably in an enlarged view so the user can evaluate the orientation, alignment and position of the needle relative to other features of the quilting machine. The bracket can include a plurality of pieces that provide the desired adjustability in the camera position. In some arrangements, the bracket can provide removable mounting of the camera so the operator can manually remove the camera from the quilting machine and hold the camera in any desired position to observe the needle or other features of the quilting machine in an enlarged view on the monitor assembly.

While the various monitoring system described above include both an imaging device (e.g., a camera assembly) and a display apparatus (e.g., a monitor assembly), other monitoring systems can operate without a display apparatus. An imaging device can be used in combination with other notification systems that provide, for example, audible signals, vibrations, or light signals, for communicating information about the sewing machine operation and the status of stitching defects to the operator.

In general terms, one aspect of the present disclosure relates to a sewing monitoring system adapted for use with a sewing machine. The sewing machine is configured to sew multiple fabric pieces together. The system can include a camera assembly and a monitor assembly. The camera assembly is arranged to create images of stitching formed in the fabric pieces by the sewing machine. The monitor assembly is configured to display the images of the stitching created by the camera assembly.

Another aspect of the present disclosure relates to a method of monitoring stitching created by a sewing machine in a piece of fabric using a monitoring system. The monitoring system includes a camera assembly and a monitor assembly. The method can include the steps of creating images of the stitching created by the sewing machine with the camera assembly, and displaying the images with the monitor assembly.

In the foregoing detailed description, various features are occasionally grouped together in a single embodiment for the purpose of streamlining the disclosure. This method of disclosure is not to be interpreted as reflecting an invention but the claimed embodiments of the subject matter require more features than are expressly recited in each claim. Rather, as the following claims reflect, inventive subject matter lies in less than all features of a single disclosed embodiment. Thus, the following claims are hereby incorporated into the detailed description, with each claim standing on its own as a separate preferred embodiment. Therefore, the sphere and scope of the appended claims should not be limited to the description of the preferred versions contained herein.

We claim:

1. A sewing monitoring system adapted for use with a sewing machine, the sewing machine having a base and an arm, the arm being mounted to the base at a rear end of the sewing machine, the sewing machine configured to sew a stitch pattern in a sheet of fabric positioned between the base and arm using a needle carried by the arm at a front end of the sewing machine, the system comprising:
- a camera positioned on a side of the sewing machine and operable to capture images of the stitch pattern along a bottom side of the sheet of fabric as the sewing machines moves relative to the sheet of fabric; and
- a monitor arranged above the sheet of fabric and positioned on the sewing machine facing in a direction along a length of the sewing machine measured between the rear end and the front end, the monitor configured to display the images of the stitch pattern for viewing by a person operating the sewing machine to manually identify an error.

2. The sewing monitoring system of claim 1, wherein the sewing machine is a long arm quilting machine and the sheet of fabric is arranged in a generally horizontal plane, the sheet of fabric having a top surface and a bottom surface, and the camera assembly creates images of stitching along the bottom surface of the sheet of fabric.

3. The sewing monitoring system of claim 1, wherein the camera is mounted to the base portion of the sewing machine and the monitor is mounted to the arm portion of the sewing machine.

4. The sewing monitoring system of claim 1, further comprising a mounting bracket configured to adjustably position the camera in at least first and second positions, the first position including an orientation for the camera to collect images of the stitch pattern and the bottom side of the sheet of fabric, and the second position including an orientation for the camera to collect images of the stitch pattern, the bottom side of the sheet of fabric, and portions of the needle of the sewing machine.

5. The sewing monitoring system of claim 1, further comprising at least one light operable to illuminate the stitch pattern along the bottom side of the sheet of fabric.

6. The sewing monitoring system of claim 5, wherein the camera and at least one light are positioned in a single housing.

7. A sewing machine, comprising:
- a base;
- an arm positioned vertically above the base and mounted to the base at a rear end of the sewing machine;
- a needle carried by the arm at a front end of the sewing machine and operable to form a plurality of stitches in a sheet of fabric positioned between the base and the arm;
- a camera mounted to the base and positioned along a side of the base, the camera being operable to capture images of the stitches along a bottom side of the sheet of fabric; and
- a monitor mounted to the arm and facing in a direction along a length of the sewing machine measured between the rear end and the front end, the monitor configured to display the images of the stitches for viewing by a person operating the sewing machine to manually identify an error.

8. The sewing machine of claim 7, wherein the sewing machine is a long arm quilting machine, the sheet of fabric is held stationary in a generally horizontal plane during operation of the sewing machine, and the sewing machine moves relative to the sheet of fabric.

9. The sewing machine of claim 7, wherein the camera is mounted to a side surface of the base.

10. The sewing machine of claim 7, wherein the monitor is mounted to one of a top surface or a side surface of the arm.

11. The sewing machine of claim 7, further comprising a mounting bracket configured to adjustably position the camera relative to the sheet of fabric and needle.

12. The sewing machine of claim 7, further comprising a light source operable to illuminate the stitch pattern.

13. The sewing machine of claim 12, wherein the camera and light source are positioned in a single housing.

14. The sewing machine of claim 7, wherein the monitor is mounted to one of a side surface and a top surface of the arm.

15. A method of identifying stitching errors in a sheet of fabric, the method comprising:
- capturing images of the stitching along a bottom side of the sheet of fabric at least immediately after the stitching is formed by a long arm quilting machine, the sheet of fabric being held stationary as the stitching is formed by the long arm quilting machine, the long arm quilting machine having a base and an arm, the arm being mounted to the base at a rear end of the long arm quilting machine, the long arm quilting machine configured to form the stitching in the sheet of fabric using a needle carried by the arm at a front end of the sewing machine;
- displaying the images at a location above the sheet of fabric and in a direction facing along a length of the long arm quilting machine measured between the rear end and the front end; and
- manually identifying errors in the stitching shown in the displayed images.

16. The method of claim 15, wherein capturing the images includes operating a camera that is positioned along a side of the long arm quilting machine.

17. The method of claim 15, wherein displaying the images includes operating a monitor that is positioned on the arm of the long arm quilting machine.

18. The method of claim 15, further comprising positioning a roll of the sheet of fabric between the base and the arm of the long arm quilting machine, the long arm quilting machine being movable along a length of the roll when forming the stitching.

19. The method of claim 18, wherein viewing the displayed images is performed by an operator positioned at the front end of the long arm quilting machine.

20. The method of claim 15, further comprising illuminating the stitching prior to capturing the images of the stitching.

\* \* \* \* \*